United States Patent [19]

Wong

[11] Patent Number: 5,790,374
[45] Date of Patent: Aug. 4, 1998

[54] METHOD AND APPARATUS FOR PROVIDING POWER ACTIVITY AND FAULT LIGHT SUPPORT USING LIGHT CONDUITS FOR SINGLE CONNECTOR ARCHITECTURE (SCA) DISK DRIVES

[75] Inventor: Daniel T. Wong, West Columbia, S.C.

[73] Assignee: NCR Corporation, Dayton, Ohio

[21] Appl. No.: 758,748

[22] Filed: Dec. 6, 1996

[51] Int. Cl.[6] .............................. G06F 1/16; G11B 33/02; F21V 33/00; F21V 8/00
[52] U.S. Cl. .............................. 361/685; 361/788; 362/32; 362/133
[58] Field of Search ................... 362/32, 133; 312/223.5; 361/685, 730, 733, 788, 796, 803; 364/708.1

[56] References Cited

U.S. PATENT DOCUMENTS

| | | | |
|---|---|---|---|
| 4,504,830 | 3/1985 | Boehme | 340/815.31 |
| 4,531,122 | 7/1985 | Redfield . | |
| 4,710,858 | 12/1987 | Van Hout et al. . | |
| 4,987,401 | 1/1991 | Gray, III . | |
| 5,144,691 | 9/1992 | August et al. . | |
| 5,396,350 | 3/1995 | Beeson et al. . | |
| 5,453,855 | 9/1995 | Nakamura et al. . | |
| 5,481,440 | 1/1996 | Oldham et al. | 362/32 |

*Primary Examiner*—Michael W. Phillips
*Attorney, Agent, or Firm*—James M. Stover

[57] ABSTRACT

A computer cabinet and hot-pluggable disk drive module design including indicator light support for the disk drive module. The cabinet includes a disk drive module receiving bay into which the disk drive module is removably installed. The disk drive receiving bay includes a backplane having at least one connector for engagement with a corresponding connector, preferably a single connector architecture (SCA) connector, protruding from a leading surface of the disk drive module. A light source mounted to the backplane near the backplane connector is illuminated to provide status information concerning the disk drive module. A light conduit extends from the light source to a conspicuous viewing location on the computer cabinet. Multiple indicator lights and corresponding light conduits tinted to different colors may be employed to provide different status indications, e.g., power, activity and fault status information. The light conduits may also be incorporated into the disk drive modules, such that once the disk drive module has been installed within the drive bay the light conduits extend from a location on a leading surface of disk drive tray opposing the light sources contained on the backplane to a conspicuous viewing location on a visible surface of the disk drive module.

10 Claims, 7 Drawing Sheets

5,790,374

METHOD AND APPARATUS FOR PROVIDING POWER ACTIVITY AND FAULT LIGHT SUPPORT USING LIGHT CONDUITS FOR SINGLE CONNECTOR ARCHITECTURE (SCA) DISK DRIVES

The present invention relates to indicator lights and associated electrical circuitry for use in computer cabinetry and, more particularly, to a method and apparatus for providing power, activity and fault light support for cabinetry housing single connector architecture disk drives.

BACKGROUND OF THE INVENTION

Single connector architecture (SCA) disk drives include a single connector for receipt of power signals and the receipt and transmission of data and control signals. Conventional, non-SCA disk drives include separate connectors for connection power and data cables. SCA disk drive connectors are designed to simplify the installation and removal of the disk drives into and out of computer cabinetry, facilitating the design and construction of hot plugable or hot swappable disk drive storage systems.

A computer server cabinet including hot plugable support for multiple SCA disk drives in shown in FIGS. 1 and 2. The cabinet includes a disk drive hot-docking bay 21 into which six SCA disk drive modules 11 through 16 may be installed. Hot-docking bay 21, located along the lower front of the server cabinet, is open in front to permit the installation and removal of SCA disk drive modules 11 through 16 from the front of the server cabinet. Cabinet doors 24 and 26 may be provided to protect the drives from damage or removal, or to hide the drives and bay from view, providing a more aesthetic appearance. The back of hot-docking bay 21 consists of a disk array controller board 23 including board mounted connectors 34 for engaging with SCA disk drive connectors 32 protruding from the back of each disk drive module.

Disk array controller board 23 includes all the power and data signal circuitry required to interface with the SCA disk drives. No interfacing boards or cabling is required to link with the drives to provide the power or data signals. Although the single connector design of SCA drives simplifies power and data signal connections, the currently available SCA disk drives do not include support for power, activity and fault indicator lights. Additional cabling is required between controller board 21 and LEDs 25 provided on the front of the server cabinetry to provide power, activity and fault information for each disk drive to the system user.

OBJECTS OF THE INVENTION

It is therefore an object of the present invention to provide a new and useful method and apparatus for providing power, activity and fault indicator light support for cabinetry housing single connector architecture disk drives.

It is another object of the present invention to provide such a method and apparatus which reduces the use of cabling and other electrical connectors to provide indicator light support for cabinetry housing single connector architecture disk drives.

It is yet another object of the present invention to provide such a method and apparatus which utilizes light pipes to conduct indicator light signals to favorable viewing locations on the cabinetry housing single connector architecture disk drives.

SUMMARY OF THE INVENTION

There is provided, in accordance with the present invention, a computer cabinet providing indicator light support for a removable modular computer component. The cabinet comprises a modular component receiving bay into which a modular computer component is removably installed. The modular component receiving bay includes a backplane having at least one connector for engagement with a corresponding connector protruding from a leading surface of the modular computer component, and a light source mounted to the backplane which is illuminated to provide status information concerning the modular computer component. A light conduit extends from the light source to a conspicuous viewing location on the computer cabinet In the described embodiment, the modular computer component consists of a single connector architecture (SCA) disk drive contained within a modular tray for installation within the component receiving bay or disk drive bay. Three indicator lights are included in the backplane to provide power, activity and fault status information, respectively, concerning the SCA disk drive. The light conduits may be tinted to different colors associated with power, activity and fault status information.

Additionally, the light conduits may be integrated into the disk drive modular tray such that once the modular tray has been installed within the drive bay the light conduits extend from a location on a leading surface of modular tray opposing the light sources contained on the backplane to a conspicuous viewing location on a visible surface of the modular tray.

The above and other objects, features, and advantages of the present invention will become apparent from the following description and the attached drawings.

DETAILED DESCRIPTION OF THE PREFERRED EMBODIMENT

Figure 1:
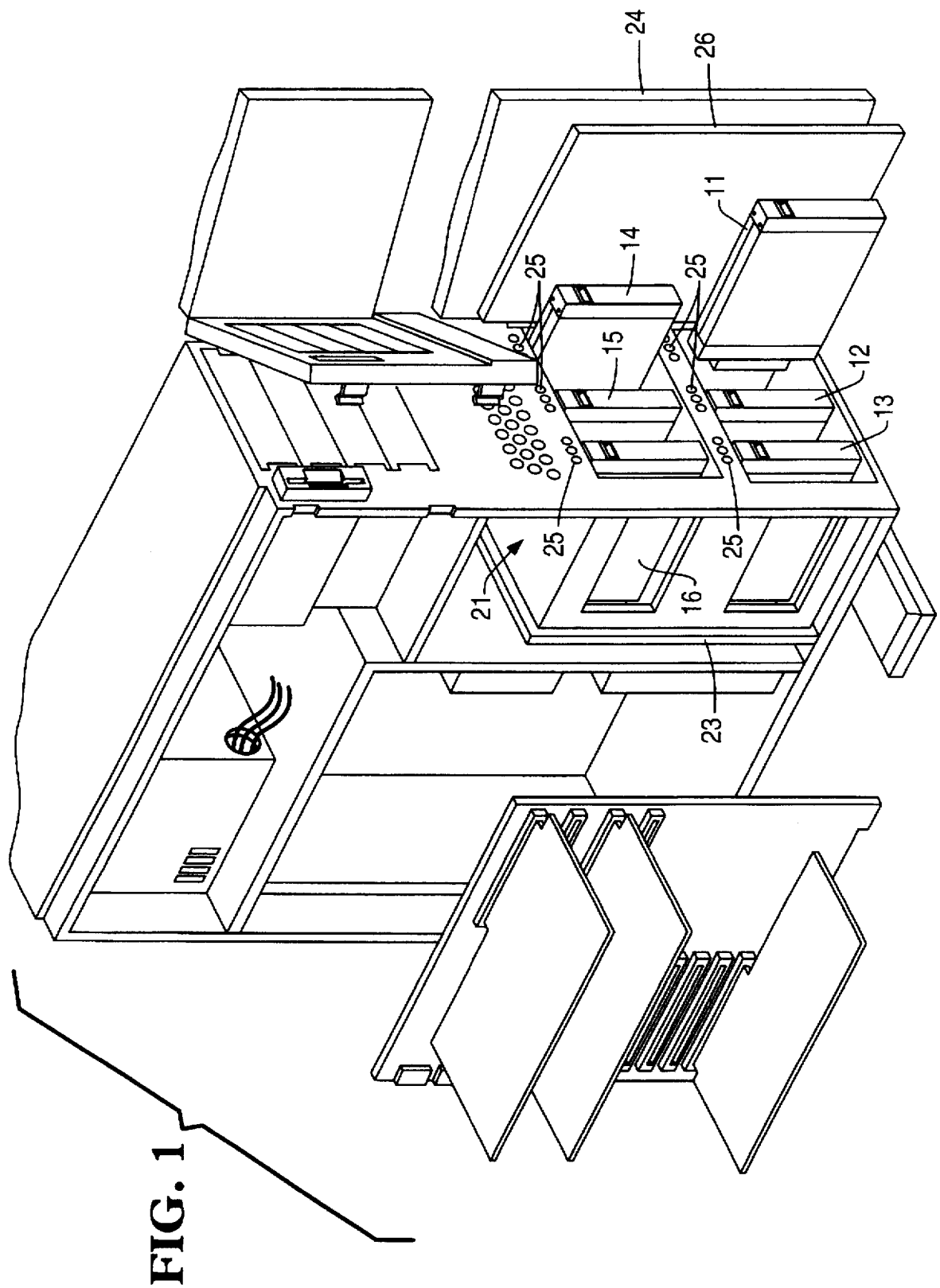
FIG. 1 is a perspective, semi-exploded, view of a computer server cabinet including hot plugable support for multiple SCA disk drives.
Figure 2:
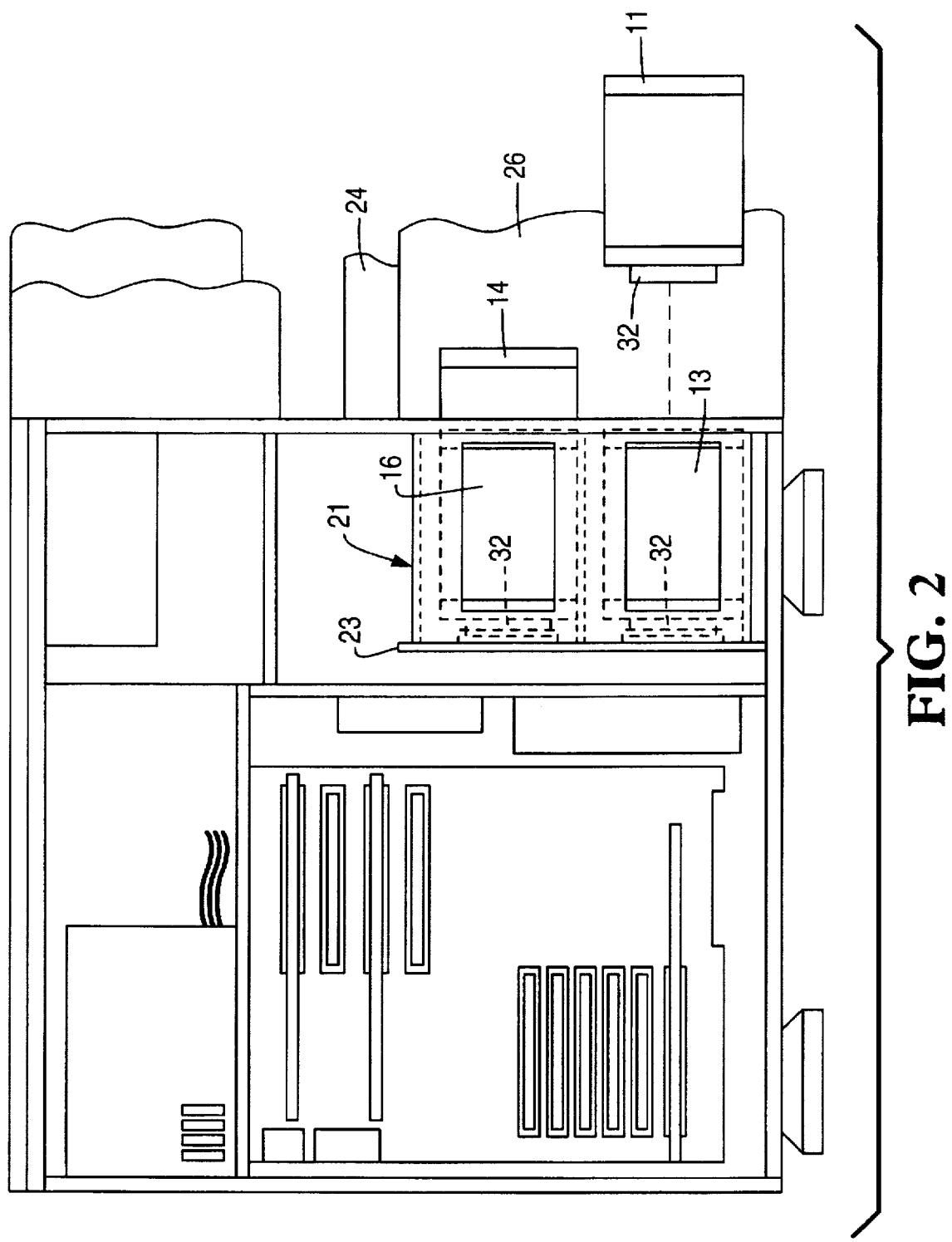
FIG. 2 is a side view of the computer server cabinet providing hot plugable SCA disk drive support shown in FIG. 1.

A computer server cabinet including hot plugable support for an array of SCA disk drives is shown in perspective and side views in FIGS. 1 and 2, respectively. The cabinet includes a 3.5-inch diskette drive, 5.25-inch external bays, a CPU module, a memory module, a system board, adapter cards, power supply, and other standard server components which are readily recognized by those skilled in the art. The computer server cabinet also includes a disk drive hot-docking bay 21 into which one to six SCA disk drive modules 11 through 16 may be installed. Hot-docking bay 21, located along the lower front of the server cabinet, is open in front to permit the installation and removal of SCA disk drive modules 11 through 16 from the front of the server cabinet into any one of six locations within hot-docking bay 21. Cabinet doors 24 and 26 may be provided to protect the drives from damage or removal, or to hide the drives and bay from view, providing a more aesthetic appearance.

Figure 3:
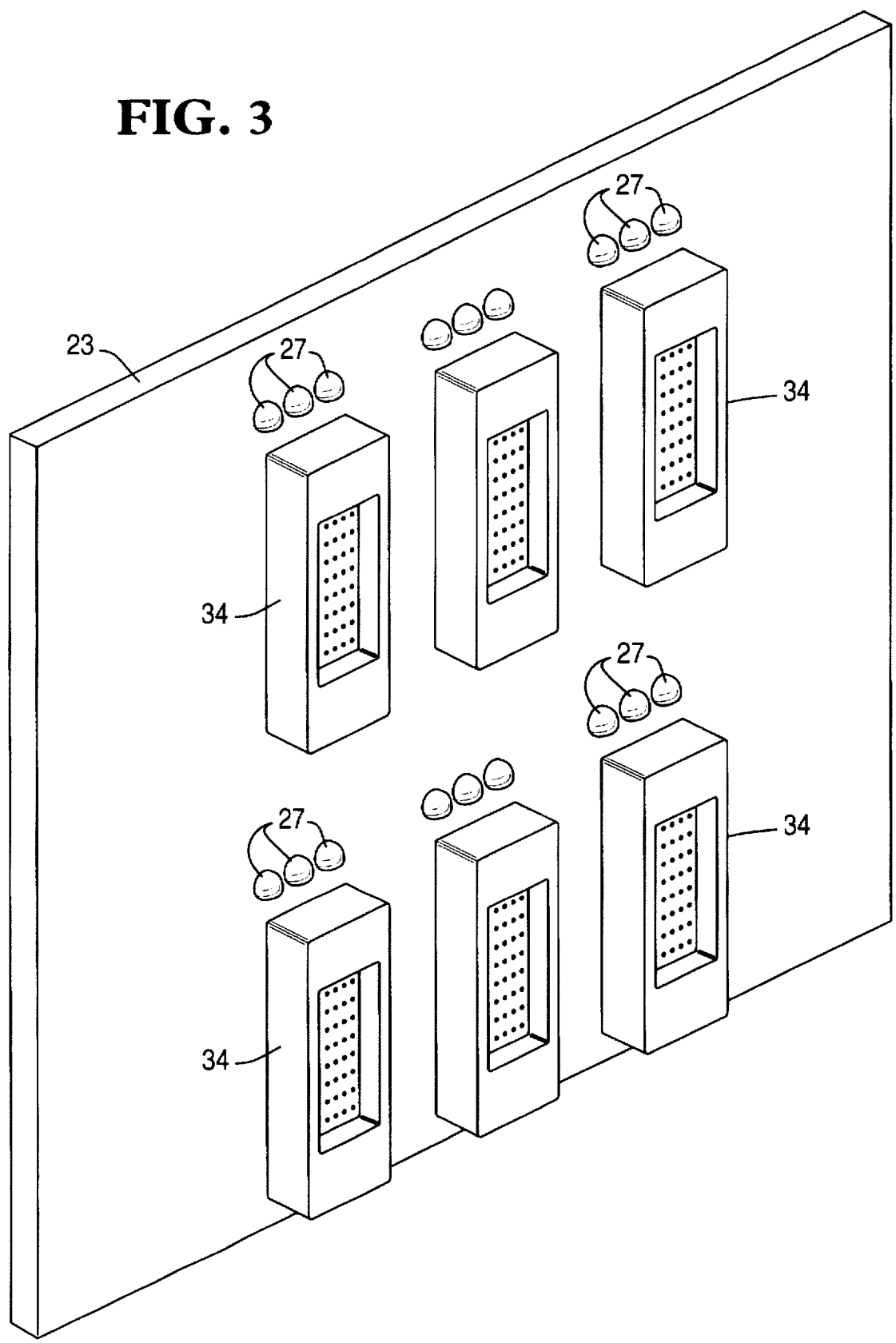
FIG. 3 is a perspective view of a disk array controller board or backplane which forms the back of disk drive bay 21 shown in FIGS. 1 and 2.

The back of hot-docking bay 21 consists of a disk array controller board or backplane 23, shown in perspective view in FIG. 3. Backplane 23 includes six board-mounted connectors 34 which engage with SCA disk drive connectors 32 protruding from the back of each disk drive module. Disk array controller board 23 includes all the power and data signal circuitry, not shown, required to interface with the SCA disk drives. Logic and structure not required for an understanding of the present invention may be omitted from the accompanying Figures.

Each disk drive module 11 through 16 consists of a modular disk drive tray into which is mounted a standard SCA disk drive. The tray is open in back to permit connection to the SCA disk drive connector 32 protruding from the back of the disk drive contained within the tray. Upon insertion into any one of the hot-docking bay's six receiving locations, the connector 32 located on the back of the SCA disk drive is automatically interconnected with a cooperating connector 34 mounted to backplane 23.

In accordance with the present invention, disk array controller backplane 23 also includes three light emitting diodes (LEDs) 27 associated with each disk drive. LEDs 27, located above each SCA connector 34, are appropriately illuminated to provide power, activity and fault information for each corresponding disk drive. However, the light generated by LEDs 27, located on backplane 23 well inside the server cabinet, is unobservable to a user unless conducted to a conspicuous viewing location, preferable on the front exterior of the server cabinet proximate the disk drive locations. Two constructions utilizing light pipes to conduct light generated by LEDs 27 to the front panel of the server cabinet will now be described.

Figure 4:
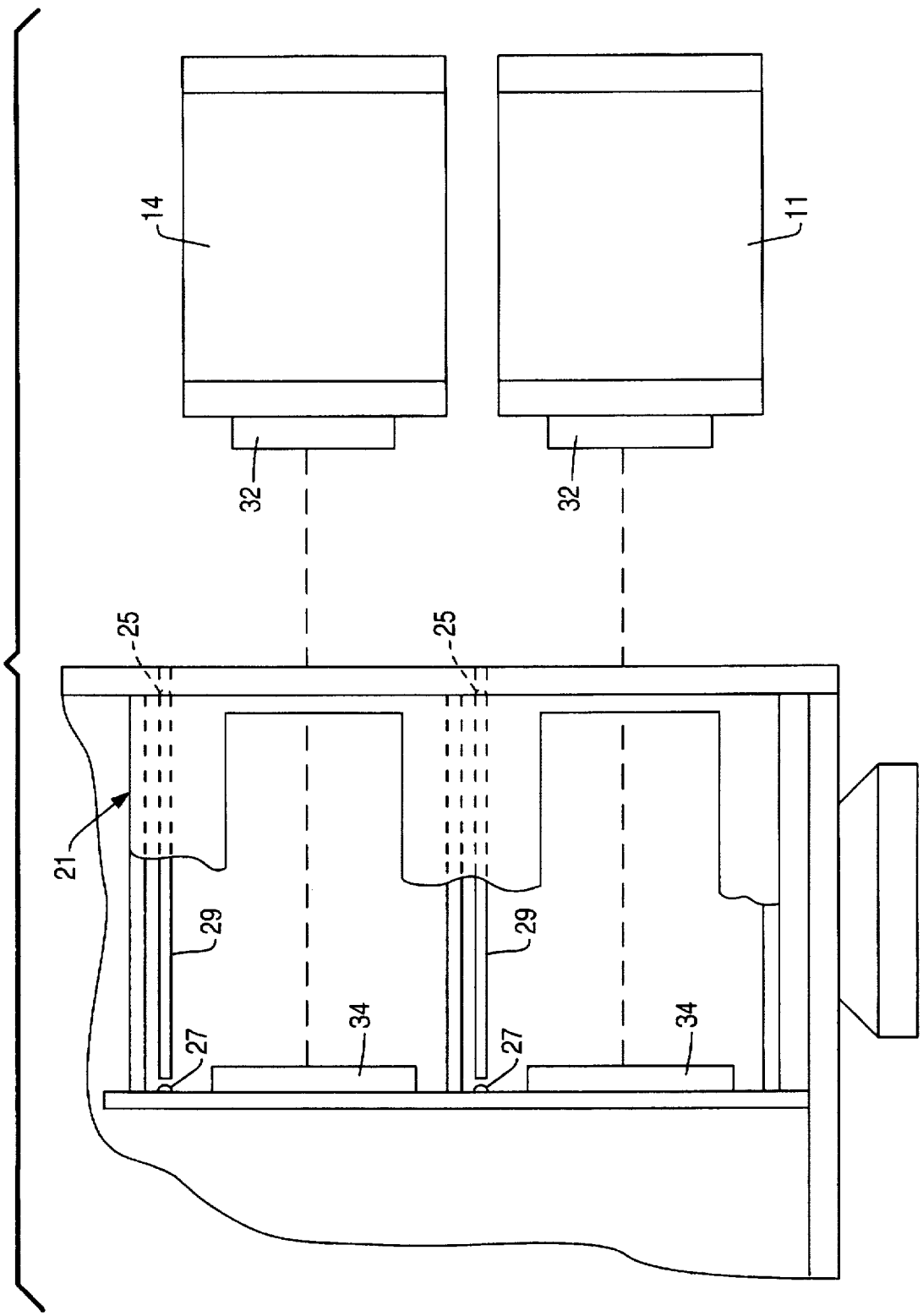
FIG. 4 is a side view of disk drive bay 21 including support for disk drive indicator lights in accordance with a first embodiment of the present invention.
Figure 5:
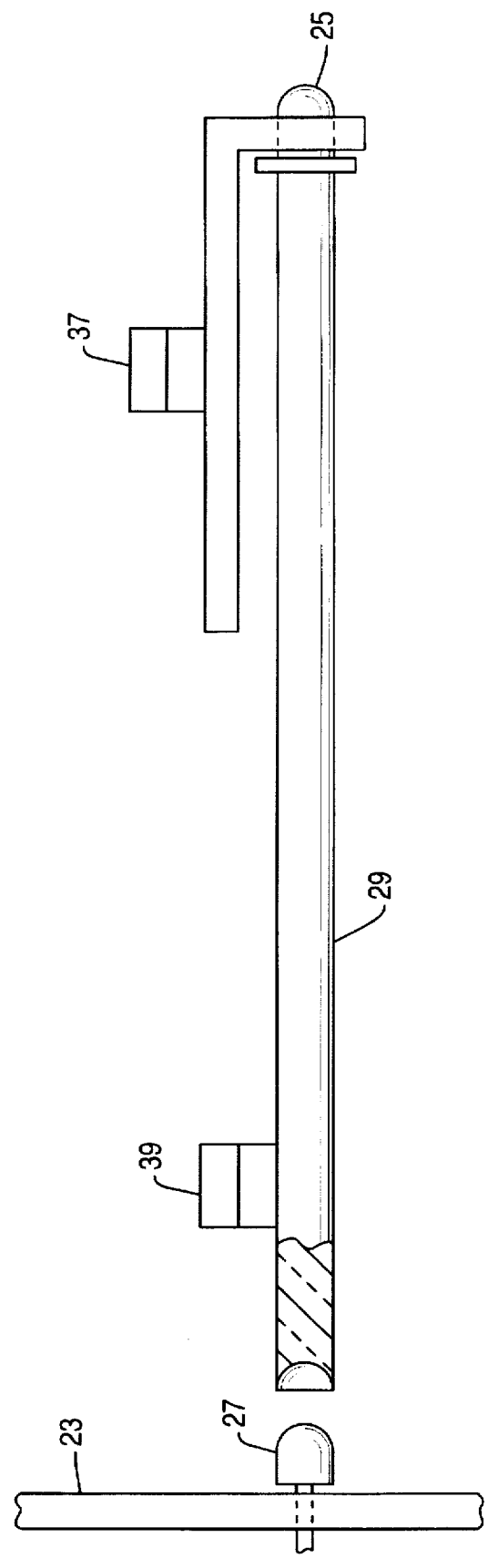
FIG. 5 is a side view of a single light pipe 29 included in disk drive bay 21 in accordance with a first embodiment of the present invention.

FIG. 4 is a side view of disk drive bay 21 including light pipes or conduits 29 incorporated into the drive bay structure to transmit light generated by LEDs 27 to lenses 25 provided on the front panel of the server cabinet. As shown, three light conduits 29 are secured to the inner surfaces of the drive bay above each disk drive location. Lenses 25 are viewed above each disk drive module on the front of the server cabinet. A single light conduit together with support structures 37 and 39 for securing the light conduit into the proper position within the drive bay is shown in FIG. 5.

Each light conduit 29 is a translucent plastic member which may be tinted different colors depending upon the purpose of the indicator light. For example, conduits utilized to show that power has been applied to a drive may be tinted green, those utilized to show drive activity may be tinted yellow, and those conduits utilized to warn of a drive failure may be tinted red.

Figure 6:
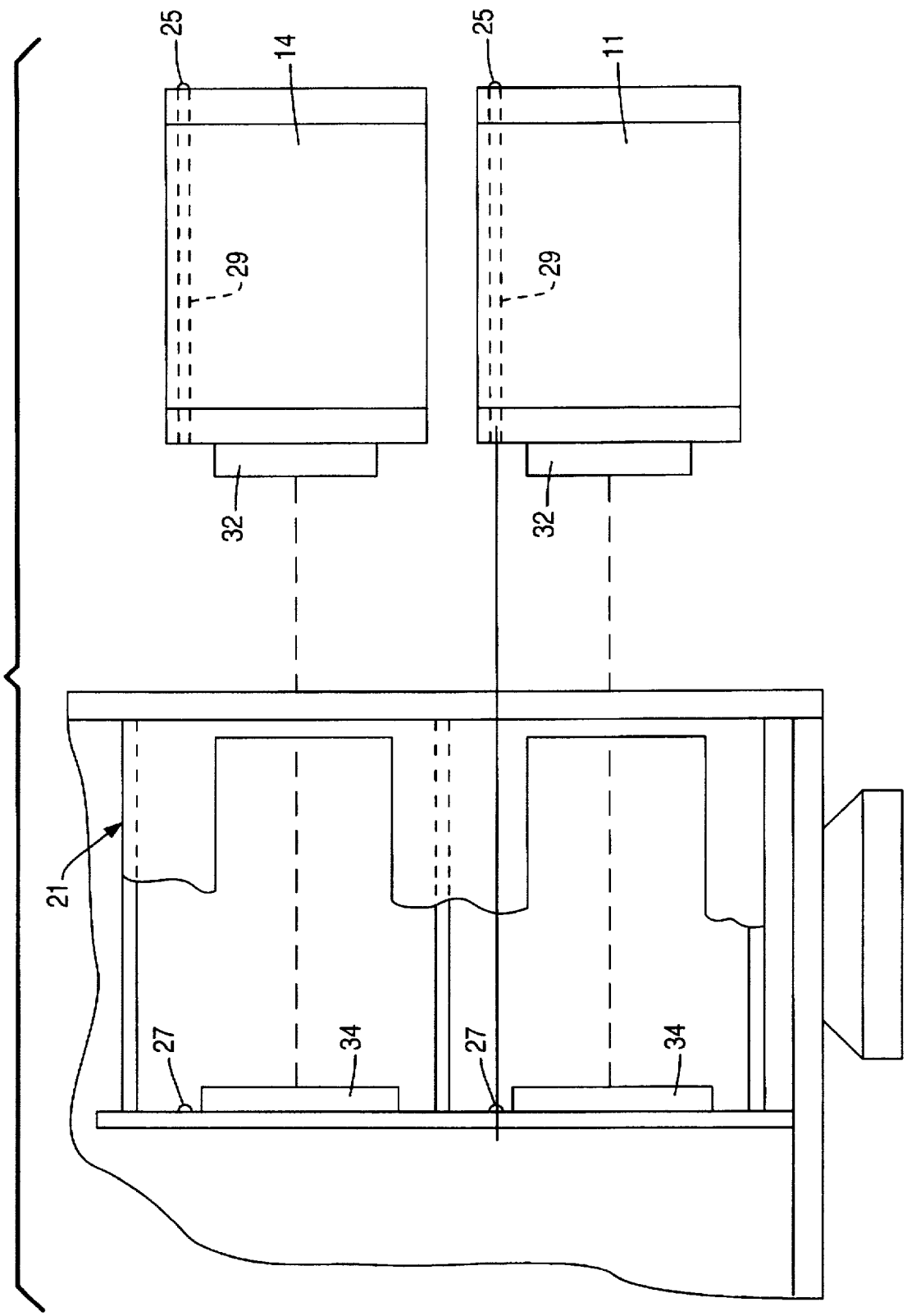
FIG. 6 is a side view of disk drive bay 21 and SCA disk drive modules 11 and 14 including support for disk drive indicator lights in accordance with a second embodiment of the present invention.

FIG. 6 is a side view of disk drive bay 21 and SCA disk drive modules 11 and 14 including light pipes or conduits 29 incorporated into each disk drive module to transmit light generated by LEDs 27 to lenses 25 provided on the front panel of the disk drive module. A perspective view of an SCA disk drive module 14 incorporating light pipes providing support for power, activity and fault lights is shown in FIG. 7.

Figure 7:
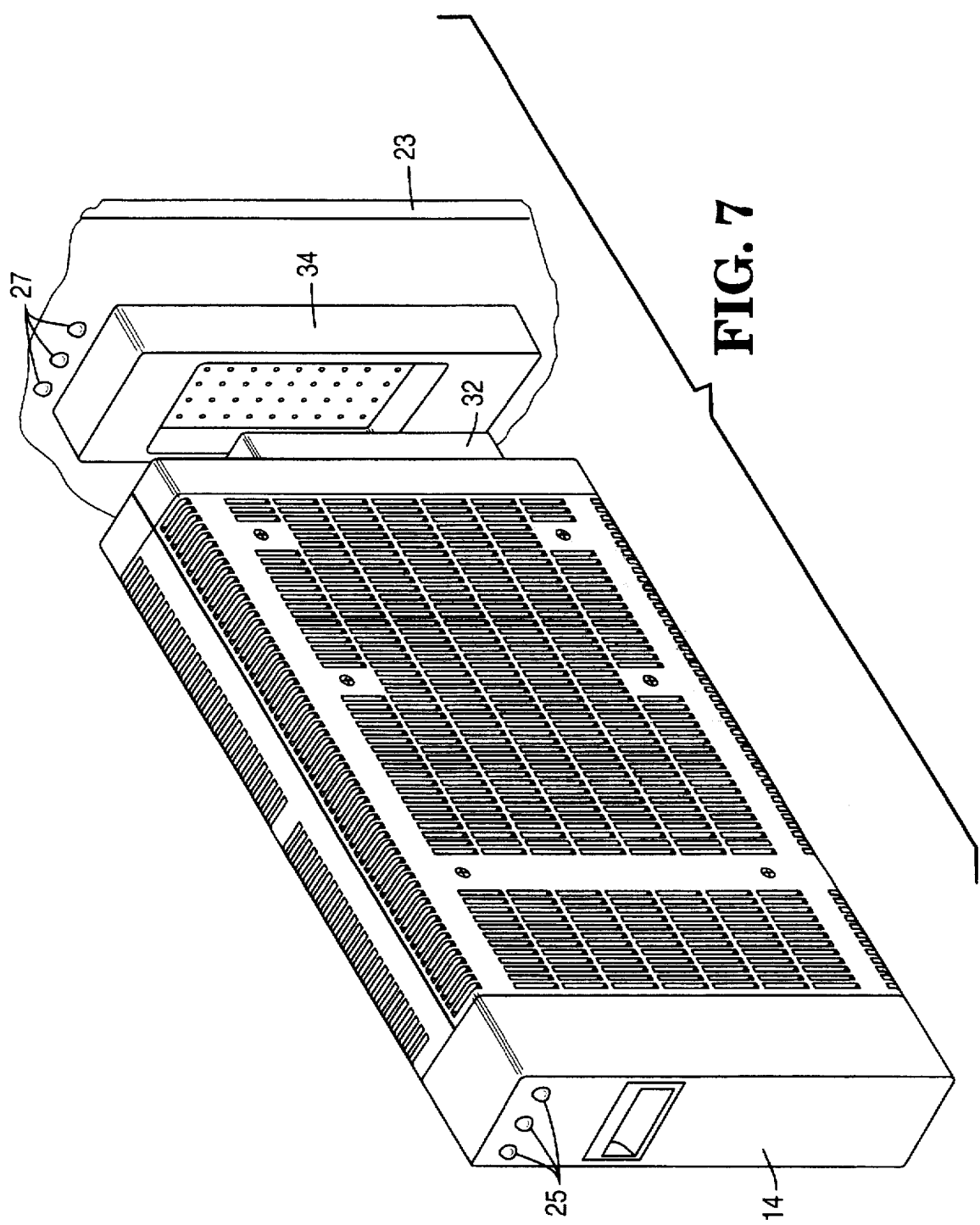
FIG. 7 is a perspective view of an SCA disk drive module14 incorporating light pipes providing support for power, activity and fault lights in accordance with a second embodiment of the present invention.

Each disk drive module 11 through 16 as shown in FIGS. 6 and 7 consists of a modular disk drive tray sized to accommodate an SCA disk drive and the three light conduits associated with the drive. The light conduits are positioned above the included disk drive in the module orientations shown in FIGS. 6 and 7. The locations of LEDs 27 on hot-docking bay backplane 27 are selected so that following the installation of a disk drive module, the three light conduits included within the module are aligned with the three LEDs 27 associated with the drive location. The conduits conduct light through the length of the disk tray body to the lenses 25 appearing on the front panel of the module.

It can thus be seen that there has been provided by the present invention a new and useful method and apparatus for providing power, activity and fault indicator light support for cabinetry housing single connector architecture (SCA) disk drives. The method and apparatus described herein reduces the use of cabling and other electrical connectors to provide indicator light support for cabinetry housing single connector architecture disk drives, instead employing light pipes to conduct indicator light signals to conspicuous viewing locations on the drive cabinetry.

For purposes of discussion, the components 11 through 16 are disk drive modules, but those skilled in the art will recognize that the principles of the present invention apply to modular computer components in general, including batteries, fans, printed circuit boards, and memory units.

Although the presently preferred embodiment of the invention has been described, it will be understood that various changes may be made within the scope of the appended claims.

What is claimed is:

1. A computer cabinet providing indicator light support for a removable modular computer component, said cabinet comprising:

a modular component receiving bay into which said modular computer component is removably installed;

said modular component receiving bay including a backplane having at least one connector for engagement with a corresponding connector protruding from a leading surface of said modular computer component;

said backplane further including a light source which is illuminated to provide status information concerning said modular computer component;

a light conduit extending from said light source to a conspicuous viewing location on said computer cabinet.

2. The computer cabinet in accordance with claim 1, wherein:

said modular computer component comprises an SCA disk drive.

3. The computer cabinet in accordance with claim 2, wherein:

said backplane includes three light sources which is illuminated to provide power, activity and fault status information, respectively, concerning said SCA disk drive; and said computer cabinet includes three light conduits, each light conduit extending from one of said three light sources to a conspicuous viewing location on said computer cabinet.

4. The computer cabinet in accordance with claim 3, wherein:

said three light conduits are translucent plastic members which are tinted to different colors, said colors being selected to correspond to said power, activity and fault status information.

5. The computer cabinet in accordance with claim 1, wherein said light conduit is secured to said modular component receiving bay above the modular computer component.

6. A computer cabinet providing indicator light support for single connector architecture disk drives, said cabinet comprising:

a disk drive module comprising an SCA disk drive including an SCA drive connector; and a disk drive tray into which said SCA disk drive is mounted, said tray including a leading surface including an opening, said SCA disk drive being mounted within said tray such that said SCA drive connector is accessible through said opening, said SCA drive connector engaging with said backplane connector when said disk drive module has been installed within said module housing;

a disk drive bay into which said disk drive module is removably installed;

said disk drive bay including a backplane having at least one connector for engagement with the SCA connector protruding from the leading surface of said disk drive module;

said backplane further including a light source which is illuminated to provide status information concerning said disk drive module;

a light conduit extending from said light source to a conspicuous viewing location on said computer cabinet.

7. The computer cabinet in accordance with claim 6, wherein:

said disk drive module may be installed into and removed from said disk drive bay while said backplane is electrically energized.

8. The computer cabinet in accordance with claim 6, wherein:

said backplane includes three light sources which is illuminated to provide power, activity and fault status information, respectively, concerning said SCA disk drive; and said computer cabinet includes three light conduits, each light conduit extending from one of said three light sources to a conspicuous viewing location on said computer cabinet.

9. The computer cabinet in accordance with claim 8, wherein:

said three light conduits are translucent plastic members which are tinted to different colors, said colors being selected to correspond to said power, activity and fault status information.

10. In a computer cabinet including a disk drive bay for receiving a removable disk drive module, said bay including a backplane having at least one connector for engagement with a connector protruding from a leading surface of said disk drive module, a method for providing indicator light support for said disk drive module, said method comprising the steps of:

providing a light source on said backplane;

illuminating said light source to provide status information concerning said disk drive module; and providing a light conduit extending from said light source to a conspicuous viewing location on said computer cabinet.

* * * * *